US011048222B2

(12) United States Patent
Saijo

(10) Patent No.: US 11,048,222 B2
(45) Date of Patent: Jun. 29, 2021

(54) NUMERICAL CONTROL DEVICE

(71) Applicant: FANUC CORPORATION, Yamanashi (JP)

(72) Inventor: Yoshinori Saijo, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/884,164

(22) Filed: May 27, 2020

(65) Prior Publication Data
US 2020/0409331 A1 Dec. 31, 2020

(30) Foreign Application Priority Data
Jun. 28, 2019 (JP) .............................. JP2019-121328

(51) Int. Cl.
*G05B 19/401* (2006.01)
*G05B 19/4155* (2006.01)
*G05B 19/404* (2006.01)
*G05B 19/18* (2006.01)
*G05B 19/406* (2006.01)

(52) U.S. Cl.
CPC ....... *G05B 19/4015* (2013.01); *G05B 19/182* (2013.01); *G05B 19/404* (2013.01); *G05B 19/406* (2013.01); *G05B 19/4155* (2013.01)

(58) Field of Classification Search
None
See application file for complete search history.

(56) References Cited

U.S. PATENT DOCUMENTS

| 10,317,876 B2* | 6/2019 | Shimizu | G05B 19/4155 |
| 2006/0229761 A1* | 10/2006 | Kita | G05B 19/4068 700/181 |
| 2020/0133228 A1* | 4/2020 | Tango | G05B 19/4155 |
| 2020/0133237 A1* | 4/2020 | Tango | G05B 19/416 |

FOREIGN PATENT DOCUMENTS

JP 2008293261 A 12/2008

* cited by examiner

*Primary Examiner* — Ryan A Jarrett
(74) *Attorney, Agent, or Firm* — Studebaker & Brackett PC

(57) ABSTRACT

A numerical control device according to the present disclosure includes: a read control unit which reads a plurality of blocks of a machining program in order; an internal processing section which performs internal processing in accordance with a block read by the read control unit; an operation control section which generates a command signal for a machine tool based on results of internal processing; an output block discrimination section which discriminates whether the block read by the read control unit is an output block including an output command, or an internal processing block not including the output command; a reference block discrimination section which discriminates whether the internal processing block is a reference block including a command to reference information which is inputted externally; and a standby processing section which in a case of the internal processing block being the reference block, causes the internal processing section to stop the internal processing in accordance with the reference block, until execution of control of the machine tool completes based on the output block which is written nearest prior to the reference block.

5 Claims, 3 Drawing Sheets

NUMERICAL CONTROL DEVICE

This application is based on and claims the benefit of priority from Japanese Patent Application No. 2019-121328, filed on 28 Jun. 2019, the content of which is incorporated herein by reference.

BACKGROUND OF THE INVENTION

Field of the Invention

The present invention relates to a numerical control device.

Related Art

Numerical control devices that control the operation of a machine tool in accordance with a machining program consisting of a plurality of blocks are widely used. The machining program can include not only blocks writing commands to make the machine tool operate, but also blocks causing information acquisition and computation for deciding operation of the machine tool to be executed in the numerical control device.

In addition, the numerical control device, even in a case of executing a block of a machining program writing a command causing the machine tool to operate, must perform pre-processing for calculating the detailed operation corresponding to the command of this block, for example, target position at every time of the drive axes, in accordance with the setting values such as speed, acceleration and jerk of the drive axes. In order to efficiently perform machining by reducing the wait time for such preprocessing, the numerical control device can be configured so as to read a block written after the block actually being executed, and perform lookahead processing to perform the necessary computation in advance.

When performing such lookahead processing, in a case of the command of a block read in advance being a command referencing information inputted from outside to the numerical control device such as the current position of a drive axis, there is a possibility of the value of information referenced changing according to the operation of the currently executed block. For this reason, when performing arithmetic processing of a block referencing such information in advance, there is concern over determining an operation based on the wrong information.

Therefore, technology has been proposed which ensures that the appropriate information is referenced to perform computation by inserting, in the machining program, a block including a lookahead stop code which causes the lookahead processing to temporarily stop prior to a block that must not be performed in advance (for example, refer to Patent Document 1).

Patent Document 1: Japanese Unexamined Patent Application, Publication No. 2008-293261

SUMMARY OF THE INVENTION

With the method described in Patent Document 1, it is necessary for the user to write the lookahead stop code at the appropriate position of the machining program. In other words, with the method described in Patent Document 1, if the user is unable to insert the lookahead stop code at the required position, operation of the machine tool becomes inappropriate, and the machining time increases unnecessarily if the user inserts the lookahead stop code at an unnecessary position. In this way, the method described in Patent Document 1 requires a high-level of understanding of the machining program by the user, and complicates creation of the machining program. For this reason, a numerical control device is desired which can perform the appropriate lookahead processing even without the user's instruction.

A numerical control device according to an aspect of the present disclosure includes: a read control unit which reads a plurality of blocks of a machining program in order; an internal processing section which performs internal processing in accordance with the block read by the read control unit, and stores a result of the internal processing; an operation control section which controls operation of a machine tool by generating a command signal for the machine tool based on results of the internal processing; an output block discrimination section which discriminates whether the block read by the read control unit is an output block including an output command causing a command signal to be outputted to the machine tool, or an internal processing block not including the output command; a reference block discrimination section which discriminates whether the internal processing block is a reference block including a command to reference information which is inputted externally; and a standby processing section which, in a case of the internal processing block being the reference block, causes the internal processing section to stop the internal processing in accordance with the reference block, until execution of control of the machine tool completes based on the output block which is written nearest prior to the reference block.

A numerical control device according to an aspect of the present disclosure can perform the appropriate lookahead processing even without a user's instruction.

DETAILED DESCRIPTION OF THE INVENTION

Figure 1:
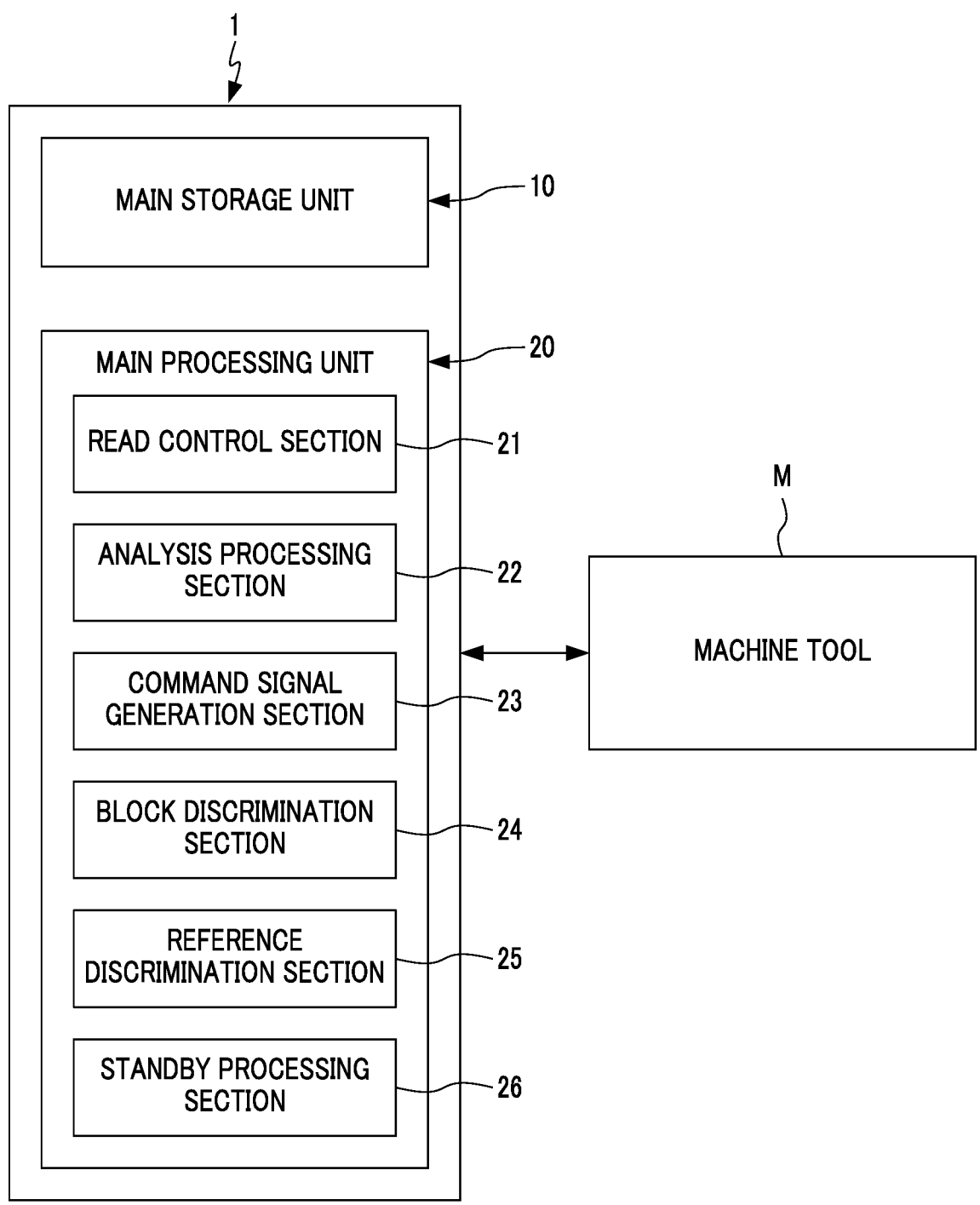
FIG. 1 is a schematic diagram showing the configuration of a numerical control device according to an embodiment of the present disclosure.

Hereinafter, an embodiment of a numerical control device according to the present disclosure will be explained while referencing the drawings. FIG. 1 shows a numerical control device 1 according to the embodiment of the present disclosure. The numerical control device 1 controls operation of a plurality of drive axes of a machine tool M including a plurality of axes based on a machining program.

The machining program includes a plurality of blocks. In the blocks of the machining program, there exists an output block including an output command to output a command signal to the machine tool M, and an internal processing block not including an output command. The output block is also called an NC statement due to writing a command that controls the machine tool M. The internal processing is macro processing which mainly handles variables. For this reason, the internal processing block is also called a macro statement. In this internal processing block, a reference block including a command that confirms information inputted from outside to the numerical control device 1 can exist. It should be noted that confirming the information inputted from outside is not only confirming a signal inputted from outside to the numerical control device 1 at this time, but also includes confirming information stored inside of the numerical control device 1 and updated as needed according to an external input.

The numerical control device 1 includes: a machine storage unit 10 that stores machining programs, and a main processing unit 20 which generates command signals inputted to the machine tool M based on the machining program.

The main storage unit 10, for example, may be configured by volatile memory such as DRAM or SRAM; however, is preferably configured by non-volatile memory such as flash memory, SSD (Solid State Drive), hard disk drive or optical disk drive, for example. The main storage unit 10, other than machining programs, can also store parameters designating conditions of operation such as the moveable range of the drive axes of the machine tool M, possible acceleration, etc.

The main processing unit 20 can be realized by causing the appropriate control program to be executed in an arithmetic unit having working memory, a CPU, etc. The main processing unit 20 has a read control section 21, internal processing section 22, operation control section 23, output block discrimination section 24, reference block discrimination section 25, and standby processing section 26. These constituent elements are distinguished in functions, and not necessarily clearly distinguishable in the configuration of the control program.

The read control section 21 reads a plurality of blocks of a machining program in order. In other words, the read control section 21 reads out the blocks of a machining program from the main storage unit 10 in order, and writes into the working memory of the main processing unit 20.

The internal processing section 22 executes internal processing in accordance with a block read by the read control section 21, and saves the internal processing result in the working memory of the main processing unit 20. As the internal processing performed by the internal processing section 22, the reading of variables, computation of variables, calculation of target positions or target speeds at every time of the drive axes of the machine tool M, etc. can be exemplified. The target position or target speed at every time of a drive axis of the machine tool M is calculated as the result of performing the operation written in the output block, at the conditions decided by the parameters of the machine tool M. By the internal processing section 22 performing internal processing according to the blocks read in advance, it becomes possible for the operation control section 23 described later to make the machine tool M to operate continuously in accordance with a plurality of output blocks.

The internal processing section 22, when executing the internal processing in accordance with the output blocks, unsets the stopped flag used in order to prevent the standby processing section 26 described later from stopping internal processing unnecessarily, for example, sets the value of the stopped flag bit set in the working memory to "0", for example.

The operation control section 23 controls the operation of the machine tool M by generating a command signal related to the machine tool M, based on the internal processing results of the internal processing section 22. The operation control section 23 may secure an operating region in the read control section 21 and internal processing section 22, by deleting the information of the result of internal processing of the output blocks executing control, etc. from the working memory. The operation control section 23 is configured so as to be able to perform processing in parallel with the internal processing section 22. It should be noted that the cycle of control in the operation control section 23 which exchanges information with the machine tool M is longer than the cycle of control in the internal processing section 22 which is completed inside of the numerical control device 1.

The output block discrimination section 24 discriminates whether a block read by the read control section 21 is an output block including an output command causing a command signal to be outputted to the machine tool M, or is an internal processing block which does not include an output command. As an example, the output block discrimination section 24, in the case of the block being a statement written according to G code, can be configured so as to discriminate as being an output block.

The reference block discrimination section 25 discriminates whether a block determined as being an internal processing block by the output block discrimination section 24 is a reference block which references information inputted from outside. More specifically, the reference block discrimination section 25 may be configured so as to determine that an internal processing block is a reference block, in a case of including a command to reference information inputted from outside, such as a command to acquire coordinates of the machine tool M, for example.

The standby processing section 26, in a case of the reference block discrimination section 25 determining that the block read by the read control section 21 is a reference block, causes internal processing according to this block by the internal processing section 22 and the reading of the next block by the read control section 21 to be stopped, until the execution of control by the operation control section 23 ends based on the output block written nearest prior to this block.

In addition, this standby processing section 26, in the case of an output block in which the operation control section 23 is not executing control not being present before the internal processing block, does not stop the internal processing according to the reference block in the internal processing section 22, and thus the reading of a subsequent block by the read control section 21. For this reason, the standby processing section 26, in a case of the reference block discrimination section 26 determining the read block as being a reference block, sets a stopped flag indicating as having already stopped the internal processing, e.g., sets the value of the stopped flag bit to "1", so as not to stop the internal processing unnecessarily, even if a reference block exists before the next output block.

Figure 2:
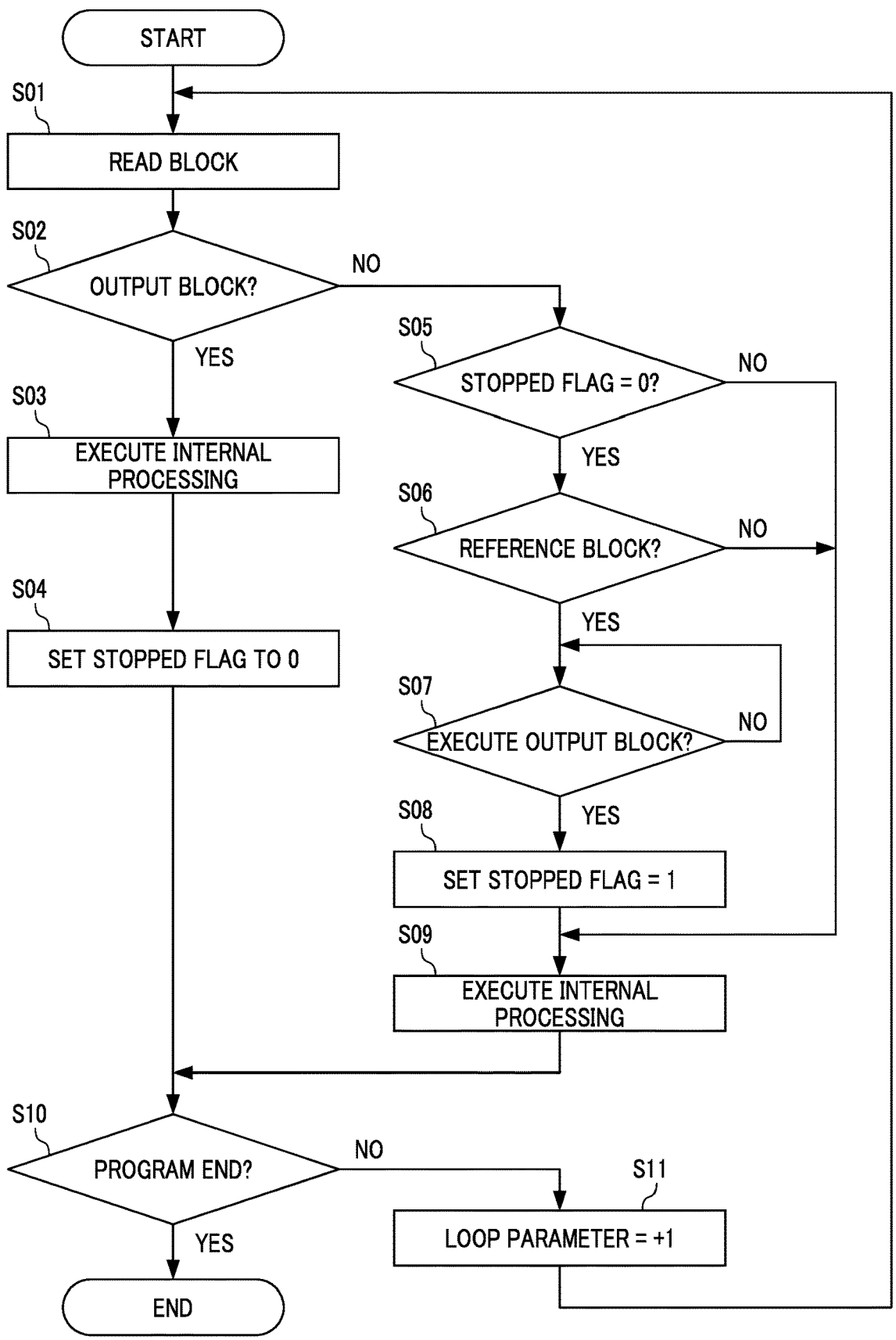
FIG. 2 is a flowchart showing the sequence of control by the numerical control device of FIG. 1.

FIG. 2 shows a sequence of control of the machine tool M, based on the machining program by the numerical control device 1. The control sequence of the numerical control device 1 includes: a step of reading a block (Step S01: block reading step); a step of confirming whether the read block is an output block (Step S02: output block confirming step); a step of performing internal processing of the output block (Step S03: output block internal processing step); a step of setting the value of the stopped flag to "0" (Step S04: stopped flag unsetting step); a step of confirming the value of the stopped flag (Step S05: stopped flag confirming step); a step of confirming whether the read block is a reference block (Step S06: reference block confirming step); a step of confirming whether execution of the output block completed (Step S07: output block execution confirming step); a step of setting the value of the stopped flag to "1" (Step S08: stopped flag setting step); a step of executing internal processing following the block read in Step S01 (Step S09: internal processing block executing step); a step of confirming whether having read until the last block of the machining program (Step S10: end confirming step); and a step of incrementing the loop parameter specifying the block of the machining program by 1 (Step S11: loop parameter adding step).

(Block Reading Step)

In the block reading step of Step S01, one block of the machining program is read from the main storage unit 10 by the read control section 21. The read control section 21 can be configured so as to read out a block designated by a loop parameter in which the initial value is defined as 1.

(Output Block Confirmation Step)

In the output block confirming step of Step S02, the output block discrimination section 24 confirms whether the block read by the read control section 21 in Step S01 immediately prior is an output block. In the case of the read block being an output block, the processing advances to Step S3, and in the case of the read block not being an output block, the processing advances to Step S05.

(Output Block Internal Processing Step)

In the output block internal processing step of Step S3, the internal processing section 22 performs processing for analyzing the output block read in Step S01, and establishing as a state which can output a command to the machine tool M. More specifically, in the output block internal processing step, based on the internal block read in Step S01, the target position or target speed at every time of the respective drive axes of the machine tool M are calculated.

(Stopped Flag Unsetting Step)

In the stopped flag unsetting step of Step S04, the value of the stopped flag bit is set to "0". It thereby enters a state capable of performing the processing from Step S06 until Step S18, i.e. determination processing by the reference block discrimination section 25 and stop processing of the internal processing by the standby processing section 26.

(Stopped Flag Confirming Step)

In the stopped flag confirming step of Step S05, the value of the stopped flag bit is confirmed. In the case of the value of the stopped flag bit being "1", the processing advances to Step S06, and in the case of the value of the stopped flag bit being "0", the processing advances to Step S09.

(Reference Block Confirming Step)

In the reference block confirming step of Step S06, the reference block discrimination section 25 confirms whether the internal processing block read by the read confirmation section 21 in the prior Step S01 is a reference block. In a case of the internal processing block being a reference block, the processing advances to Step S07, and in the case of the internal processing block not being a reference block, the processing advances to Step S09.

(Output Block Execution Confirming Step)

In the output block execution confirming step of Step S07, the standby processing section 26 stands by until execution of control by the operation control section 23 completes based on the output block written the nearest before this reference block. In other words, the output block execution confirming step, in a case of execution of control completing based on the nearest output block in the output block execution confirming step, advances the processing to next Step S18; however, in the case of execution of control not completing based on the nearest output block, the processing performs confirmation processing of the same Step S07. Until execution of control completes based on the latest output block, the internal processing in accordance with this block by the internal processing section 22 and reading of the next block by the read control section 21 is thereby stopped.

(Stopped Flag Setting Step)

In the stopped flag setting step of Step S08, the standby processing section 26 sets the value of the stopped flag to "1". The machining program, in the case of a different reference block being written prior to the next output block, thereby prevents from performing of the processing of Steps S06 and S07 unnecessarily.

(Internal Processing Block Executing Step)

In the internal processing block executing step of Step S09, the internal processing section 22 analyzes the internal block read in the latest Step S01, and executes internal processing in accordance with the internal processing block.

(End Confirming Step)

In the end confirming step of Step S10, it is confirmed whether the block read in the latest Step S01 is the last block of the machining program. In the case of the target block being the last block in the machining program, the processing is ended, and in the case of the target block not being the last block in the machining program, the processing advances to Step S11.

(Loop Parameter Adding Step)

The loop parameter adding step of Step S11 increments the loop parameter by 1. After executing the loop parameter adding step, the processing returns to Step S01, and reads out the next block.

Figure 3:
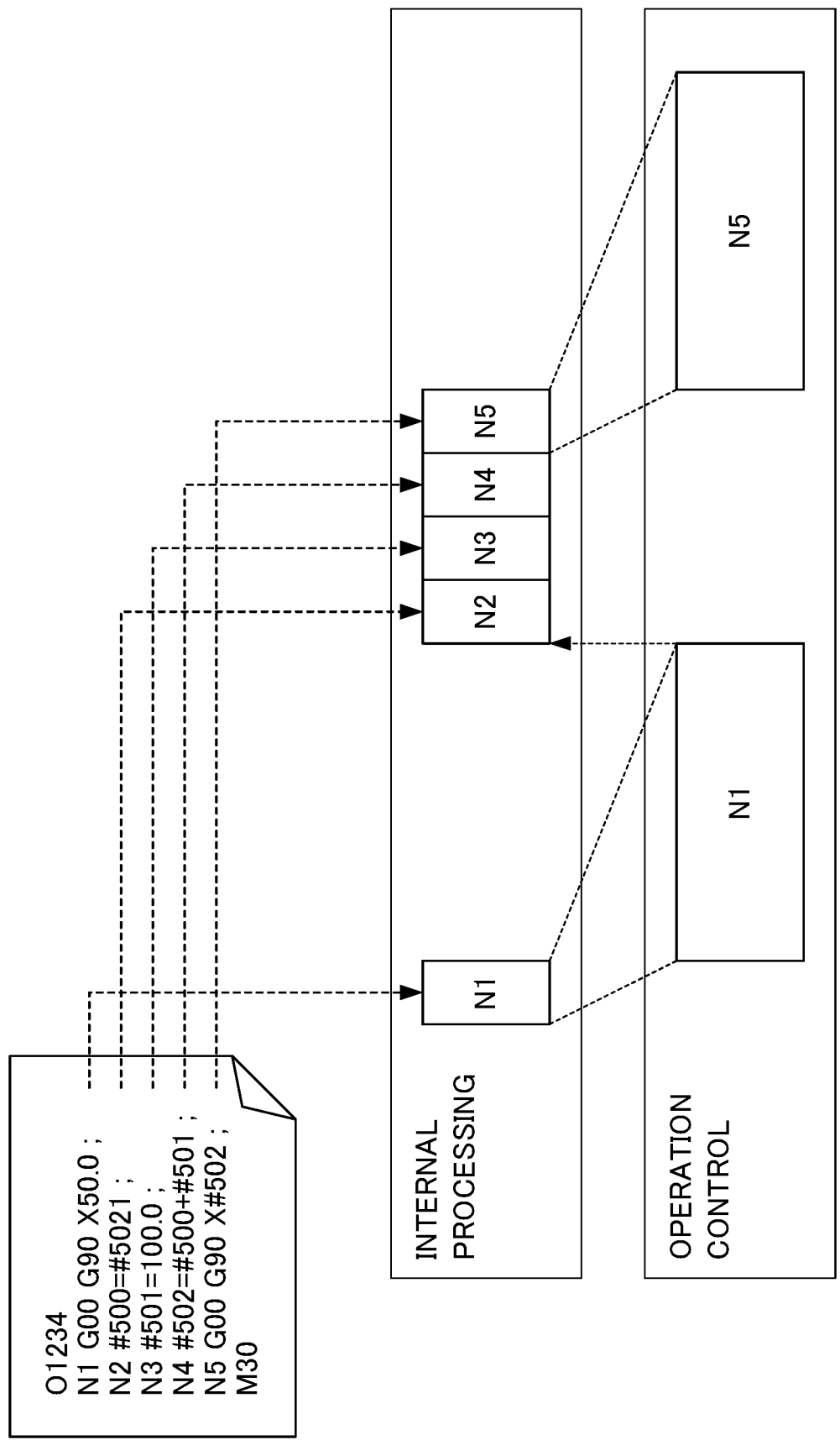
FIG. 3 is a schematic diagram exemplifying control by the numerical control device of FIG. 1.

FIG. 3 shows "O1234" which is an example of a machining program, and the timing of processing in the case of the numerical control device 1 executing this machining program. In the exemplified machining program, blocks N1 and N5 are output blocks designating operation of the plurality of drive axes of the machine tool M, and the blocks N2, N3 and N4 are internal processing blocks which do not generate a command signal for the machine tool M. Thereamong, the block N2 is a reference block which references the coordinate position specified according to a signal fed back from the machine tool M.

The numerical control device 1 first reads the output block N1 by way of the read control section 21, and performs internal processing of the output block N1 by way of the internal processing section 22. If the internal processing of the output block N1 progresses, and enters a state capable of outputting a command signal to the drive axes of the machine tool M based on the internal processing results of the output block N1, the control to operate the machine tool M is executed in accordance with the output block N1 by the operation control section 23.

If the internal processing of the output block N1 completed, the internal processing block N2 is read by the read control section 21 in parallel with the execution of control in accordance with the output block N1 by the operation control section 23. Since this internal processing block N2 is a reference block, the standby processing section 26 causes the execution of internal processing in accordance with the internal processing block N2 by the internal processing section 22 to hold until the execution of the output block N1 completes.

If the execution of the output block N1 by the operation control section 23 completes, and the internal processing of the internal processing block N2 by the internal processing section 22 completes, the standby processing section 26 sets the stopped flag, and then the internal processing block N2 is read by the read control section 21. At this time, since the stopped flag is set, the internal processing section 22 performs internal processing in accordance with the internal processing block N3. Next, reading and internal processing of the internal processing block N4 is executed.

Next, the output block N5 is read by the read control section 21, and the internal processing of the output block N1 is performed by the internal processing section 22. If becoming able to output a command signal to the drive axes of the machine tool M based on the output block N5 by way of this internal processing, the operation control section 23 executes control causing the machine tool M to operate in accordance with the internal processing results of the output block N5.

The numerical control device 1 stops the internal processing in accordance with the reference block N2 looked ahead until the control of the machine tool M in accordance with the output block N1 completes, by way of the standby processing section 26; therefore, it is possible to reference the appropriate coordinate value reflecting the operating results of following the output block N1 in the reference block N2, and execute the following blocks N3 to N5.

In this way, the numerical control device 1 can perform the appropriate lookahead processing even without the user instructing, and thus shorten the overall processing time.

Although an embodiment of the numerical control device according to the present disclosure has been explained above, the numerical control device according to the present disclosure is not to be limited to the above-mentioned embodiment. In addition, the effects described in the above-mentioned embodiment are merely listing the most favorable effects produced from the numerical control device according to the present disclosure, and the effects from the numerical control device according to the present disclosure are not to be limited to those described in the above-mentioned embodiment.

In the above-mentioned embodiment, it is determined whether to confirm if the read internal processing block is a reference flag according to the stopped flag; however, it may be configured to confirm whether an unexecuted output block exists every time.

EXPLANATION OF REFERENCE NUMERALS

1 numerical control device
10 main storage unit
20 main processing unit
21 read control section
22 internal processing section
23 operation control section
24 output block discrimination section
25 reference block discrimination section
26 standby processing section
M machine tool

What is claimed is:

1. A numerical control device comprising:
   a read control section which reads a plurality of blocks of a machining program in order;
   an internal processing section which performs internal processing in accordance with the block read by the read control section, and stores a result of the internal processing;
   an operation control section which controls operation of a machine tool by generating a command signal for the machine tool based on results of the internal processing;
   an output block discrimination section which discriminates whether the block read by the read control section is an output block including an output command causing a command signal to be outputted to the machine tool, or an internal processing block not including the output command;
   a reference block discrimination section which discriminates whether the internal processing block is a reference block including a command to reference information which is inputted externally; and
   a standby processing section which, in a case of the internal processing block being the reference block, causes the internal processing section to stop the internal processing in accordance with the reference block, until execution of control of the machine tool completes based on the output block which is written nearest prior to the reference block.

2. The numerical control device according to claim 1, wherein the standby processing section sets a stopped flag indicating that the internal processing in accordance with the reference block has stopped.

3. The numerical control device according to claim 2, wherein the internal processing section onsets the stopped flag, when the internal processing in accordance with the output block has been performed.

4. The numerical control device according to claim 1, wherein the standby processing section, in a case of the output block in which the operation control section is not executing control of the machine tool not being present prior to the internal processing block, does not stop the internal processing in accordance with the reference block by the internal processing section.

5. The numerical control device according to claim 1, wherein the standby processing section, in a case of the internal processing block being the reference block, stops reading by the read control section of the block which is subsequent, until execution of control of the machine tool completes based on the output block written nearest prior to the reference block.

* * * * *